United States Patent [19] [11] 4,179,717
Maxey [45] Dec. 18, 1979

[54] METHOD AND APPARATUS FOR VIDEO SIGNAL RECORDING

[75] Inventor: Alexander R. Maxey, Redwood City, Calif.

[73] Assignee: Arvin Industries, Inc., Columbus, Ind.

[21] Appl. No.: 945,421

[22] Filed: Sep. 25, 1978

Related U.S. Application Data

[63] Continuation-in-part of Ser. No. 874,118, Feb. 1, 1978.

[51] Int. Cl.² .............................................. G11B 21/04
[52] U.S. Cl. ..................................................... 360/84
[58] Field of Search ...................... 360/8, 9, 11, 84, 85

[56] References Cited

U.S. PATENT DOCUMENTS 3,188,385  6/1965  Kimara ..................................... 360/84

Primary Examiner—Robert S. Tupper
Attorney, Agent, or Firm—Biebel, French & Nauman

[57] ABSTRACT

A method and apparatus for video signal recording comprises helically scanning a plurality of transducer heads (20-23) sequentially along separate parallel paths (30-32) of equal width on a record medium (10) at a rate such that a plurality of the scans occur within a field interval, and diverting the signal in predetermined sequence to different ones of the heads. The scanning of said heads and diverting of the signal to different heads is arranged to cause some redundant recording of information in different ones of the paths, information recorded in a path that is adjacent an edge of the medium having corresponding redundant information recorded in an internal path that is bounded by other parallel paths. The apparatus includes a rotary scanner (12) having at least three transducer heads spaced along and around the axis of rotation of the scanner whereby each head scans along a different circular orbit and at a different time across a segment of a cylindrical surface defined by the plural orbits, and a transport for moving a recording tape across a segment of such cylindrical surface in timed relation to scanning rotation of the heads and at an angle to the axis of rotation such that each head traces a series of helical scans on the medium within non-overlapping paths along the direction of motion of the medium. The heads rotate at a speed sufficient to separate each scan of a head along the corresponding path.

5 Claims, 9 Drawing Figures

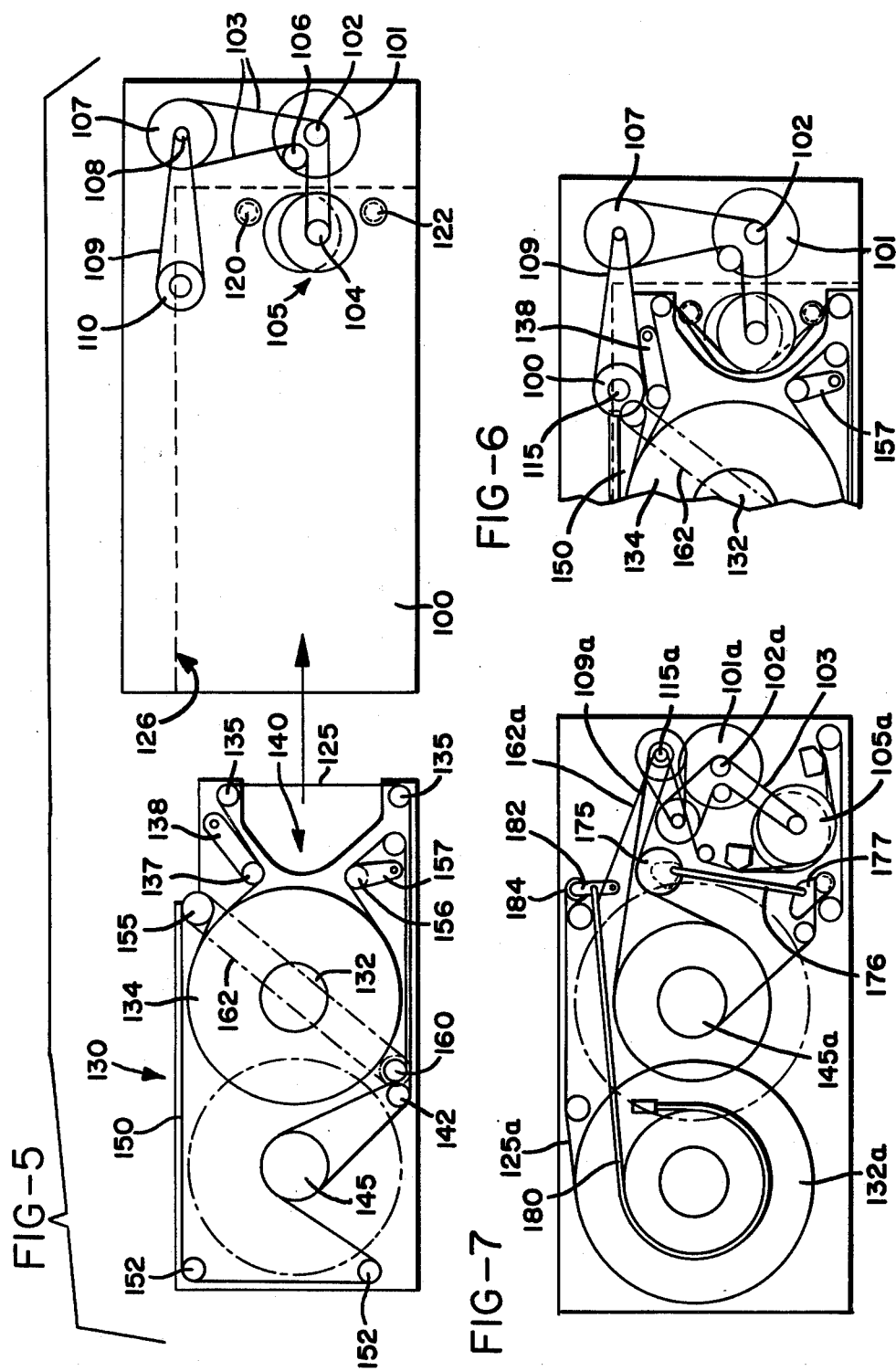

METHOD AND APPARATUS FOR VIDEO SIGNAL RECORDING

CROSS-REFERENCE TO RELATED APPLICATION

This application is a continuation-in-part of copending U.S. application Ser. No. 874,118 filed Feb. 1, 1978.

BACKGROUND OF THE INVENTION

This invention relates to a wide band magnetic recording system, and particularly to types of scanners and scanning formats for the magnetic recorders in which the transducer heads are continuously scanned at a relatively higher velocity past a moving record media, such as recording tape, which is moving at a substanilly lesser velocity.

A number of different types of scanners have been known. One of the first in wide commercial use was the so-called transverse scan, quad format, which is typified by the many presently used studio television recorders. It is disclosed in U.S. Pat. Nos. 2,912,518, and 2,956,114. A relatively wide tape is moved along its length, and at the recording station the cross section of the tape is formed to take the shape of a section of a cylinder. The arc of the section may be slightly in excess of 90 degrees.

The transducer heads are mounted on a wheel which has an axis of rotation parallel to the longitudinal center line of the tape path, and the transducer heads rotate in a common circle or orbit, consecutively scanning transversely of the recording tape. The tape motion spaces apart the successive scans of the heads and the "wrap" of the tape around the transducer orbit is such that one head begins recording interface with the tape before the preceding head leaves the tape. Each head scans essentially the full width of the tape, and the angle of the scans with respect to the length of the tape is a relatively large angle, usually in excess of 60 degrees and closer to 90 degrees. This angle, of course, will vary with differences in velocities of tape movement and head rotation.

Another form of scanner is commonly referred to as the helical scan, and it in turn is embodied in several different ways. In most cases the scans are at a much lesser angle to the tape length, such as between 30° and 60°. For example, a single head is rotated in a circle or orbit, and the recording tape is wrapped around the mandrel or drum on which the head rotates, either with the drum itself rotating or the head rotating in a slot around the drum surface. The tape is wrapped completely around the drum (360° wrap) and the single head thus produces successive scans at an angle across the tape. This angle will depend again on the relative head and tape velocities, and also on the diameter of the head orbit and the width of the tape, each of these being a factor in determining the helix angle at which the tape wraps acound the drum.

Another version of the helical scan recorder utilizes the so-called omega wrap, wherein the tape extends around the scanner drum or mandrel in a loop which is slightly open, a few degrees less than 360°. Again, it is most common in this type of system to utilize a single head, and the scanner diameter, tape width, and the head and tape velocities are selected and correlated such that when used for television recording, this system normally scans at a rate such that one scan of the head at an angle across the tape corresponds in time to one field of video information.

Another version of scanner utilizes a tape wrap slightly in excess of 180° and two diametrically opposed heads, as in U.S. Pat. No. 3,418,424. The heads transduce the same signal, and due to the wrap of slightly over 180° there is a small amount of redundancy where one head leaves the tape and the other enters into interface with the tape. Scanners of this type have been proposed for single field recording, and in addition some such scanners have utilized a format where each scan occurs so rapidly that only a segment of any video field is recorded. In such instance the scanner system has been known in the art as the "segmented field" recorder and scanner.

Various other scanner arrangements have been proposed utilizing three transducer heads instead of two, with a 120° wrap, or four heads with a wrap slightly in excess of 90°. Such scanners have been found, for example, in systems which were introduced to the commercial market, but have since been discontinued for one reason or another.

As mentioned previously, some of these scanners utilize a rotating drum or wheel (the terms are often used syonymously, but larger diameter rotating members have also been called wheels), to carry the heads, while in units with smaller diameters the heads rotate in slots formed in stationary drums or mandrels. With a few exceptions, however, when a plurality of heads is used they have been arranged to follow the same orbit or circle.

One exception to the common orbit scanner is a single field omega wrap scanner, disclosed in U.S. Pat. No. 3,188,385, where two heads are utilized spaced axially of the scanner as well as circumferentially. The circumferential spacing is non-uniform, one head lagging the other by an acute angle in the order of 8° to 10°. In video recording, one head receives the video information for an entire field, and the other head receives only vertical synchronizing information which is recorded in a separate path or track along one edge of the tape. These vertical sync scans are substantially lesser in width than the main scans on which full field information is recorded.

Another exception is the skip field recorder such as disclosed in U.S. Pat. No. 3,588,378. There a single head is used to scan helically and record one of every three fields of a television signal. The scan extends the full width of the tape. Three playback heads are used, spaced 120° apart. The head to tape relation is mechanically phase shifted from record position to playback position, so that each of the three playback heads tracks in sequence the same single scan previously followed by the record head. For this purpose, the playback heads are axially displaced a small amount, but the scanning helix angle is such that each of the heads scans fully across the tape.

All of the above mentioned scanners, except the transverse scan quad format, require either a substantial change in elevation of the tape in passing around the scanner drum, or use of a rather large drum mounted with its axis of rotation at a small angle to the tape path. The transverse scan, of course, requires a semicylindrical forming of a longitudinal section of a wide tape, bending it generally about its longitudinal axis, and this presents increasing difficulties as narrower tape is used. As a rule, four inch wide tape is used with the transverse scan quad format.

When change in tape elevation is encountered with narrower tapes (e.g., two inch or less) helical scan formats which use a smaller diameter and greater angle of scan, complex rollers, guides, etc., are required to control precisely the movement of the tape onto, around, and exiting from the scanner.

Various proposals have been made for scanners which cooperate with a cartridge or cassette (the terms are sometimes used interchangeably) which provides a convenient mechanism for storing and handling the recording tape. A number of systems have become known commercially, as follows.

The first system involves a two-head scanning wheel with mechanism that reaches into a cassette and withdraws the tape, forming the tape into a loop of more than 180° around the scanner. Such a system is utilized commercially by a number of companies such as Sony, Phillips and JVC.

A second arrangement, marketed by a company known as Cartridge Television, Inc., utilizes a scanning wheel with three heads. The tape is again, however, withdrawn from the cassette and formed into a turn of slightly more than 120° around the scanning wheel.

A third system, which has been proposed by companies such as Ampex and Matushita, involves the use of a cartridge with a single spool, having a free end of tape extending from the cartridge with a leader thereon, together with a self-threading mechanism that directs the leader and tape around a two head scanning wheel, wrapped in excess of 180°, and thence to a take-up spool which is separate from the cartridge.

A fourth type of cartridge system was introduced by RCA, and utilizes a cartridge with an opening that can be uncovered in one of its edges to expose a span of tape, the space behind such span being somewhat open within the cartridge, and a four head scanning wheel. This is shown in U.S. Pat. No. 3,766,328. The cartridge is inserted around the circular periphery of the scanning wheel, such that the span of tape forms a turn within the cartridge contacting the scanning wheel over an arc slightly in excess of 90°.

All of the aforementioned cartridge (or cassette) systems, however, utilize rather large scanning wheels, having diameters in the order of six to nine inches, such that the tape wrapped around the scanning wheel is of considerable extent.

Another problem of rotary scanners is concerned with head tracking at different tape speeds. Since the rotational speed of a scanner is considerably greater than the longitudinal tape speed, the ultimate head-to-tape speed is only slightly affected by changes in this longitudinal speed. Therefore, it is possible to slow the tape and still recover recorded information at a satisfactory signal/noise ratio. However, this slowing of the tape does introduce tracking errors due to a change in the angle at which the scanning head moves across the tape. In prior art rotary head recorders, since a head scan proceeds entirely across the tape, the tracking error is significant, and various devices, such as servo-positioning of the head during playback, have been proposed to improve tracking.

SUMMARY OF THE INVENTION

The present invention provides a novel recording format, a novel wide bandwidth magnetic recorder, and a novel scanning mechanism and method for such a recorder, together with several embodiments of recorder arrangements including a cassette version, in each of which embodiments the amount of recording media, e.g., magnetic tape occupies a substantially high percentage of the total volume of the recorder than has heretofore been possible. This, in turn, results in a recorder which provides maximum capacity for the space which it occupies.

The combination of the novel format, scanner, and tape handling mechanisms of the recorder, provide a type of segmented helical scan system in which recording tape changes elevation only an insignificant amount, thereby providing a unit which has an unusually low total thickness. This is significant in a number of respects, including the provision of a relatively thin cassette in a wide band width recorder which is fully capable of color video recording.

The scanner provided by this invention incorporates at least three, preferably four simultaneously rotating transducer heads. These may be supported for rotation in a number of ways, but a most convenient arrangement is to mount the heads spaced equally around a rotating scanning drum, and also spaced longitudinally of the axis of rotation of the drum. The longitudinal and axial spacing of the heads, and the diameter of their orbits, are correlated to the angle which the scanner axis of rotation assumes relative to the longitudinal axis (and hence the path) of the recording tape, and to the angle of wrap of the tape around the scanner. The heads are spaced apart far enough in the axial direction that each head revolves in a scanning circle or orbit which traces separate helical scan paths longitudinally of the tape. In other words, the successive scans, or scanning paths, of any one head never occupy a position on the tape overlapping scans, or scanning paths, of the other heads.

This results in a novel recording format. In the handling of television signals, for example, the scanner rotation and tape speed is selected such that each field is recorded in several scans of different heads, located in different paths along the tape, e.g., a new type of segmented field recording. The format is, of course, useful also in other recording than television.

It is possible to arrange the circumferential and axial spacings of the heads such that any redundant information occurs where the scan paths are adjacent, rather than nearer to the edges of the tape where it is possible that head to tape contact might at times not be consistent.

Also, with this format tracking errors caused by reduced tape speed (longitudinal tape velocity) are reduced by a factor of n, where n is the number of non-coplanar heads used in the scanner. This allows higher quality of playback at slower speeds, as in slow motion reproduction.

The scanner and format also provide a novel arrangement of head scanner interface which uses significantly less than 180° of tape turn. Thus, a short length of tape can be exposed along a side of a cassette, and the cassette inserted only slightly around the scanner to achieve the necessary interface. It is not necessary to draw a loop from the cassette, nor to provide any complex guide rollers, etc., in the cassette which would require precision location to the scanner. The invention thus includes provision of a novel cassette type wide band magnetic recorder.

In two forms of the system, one a reel-to-reel and the other a cassette version, the tape is guided and fed by a belt system, generally of the type disclosed in U.S. Pat. No. 3,305,186. This system is sometimes known as the Isoelastic Drive. It maintains the tape under complete control and proper tension at all times.

BRIEF DESCRIPTION OF THE DRAWINGS

FIG. 5 is a plan view of a transport arrangement involving the scanner and system of the invention together with a corresponding tape cassette;

FIG. 6 is a detail view of the tape path with the cassette located on the transport deck;

FIG. 7 is a plan view of another embodiment of the invention;

DESCRIPTION OF THE PREFERRED EMBODIMENT

Figures 1, 2:
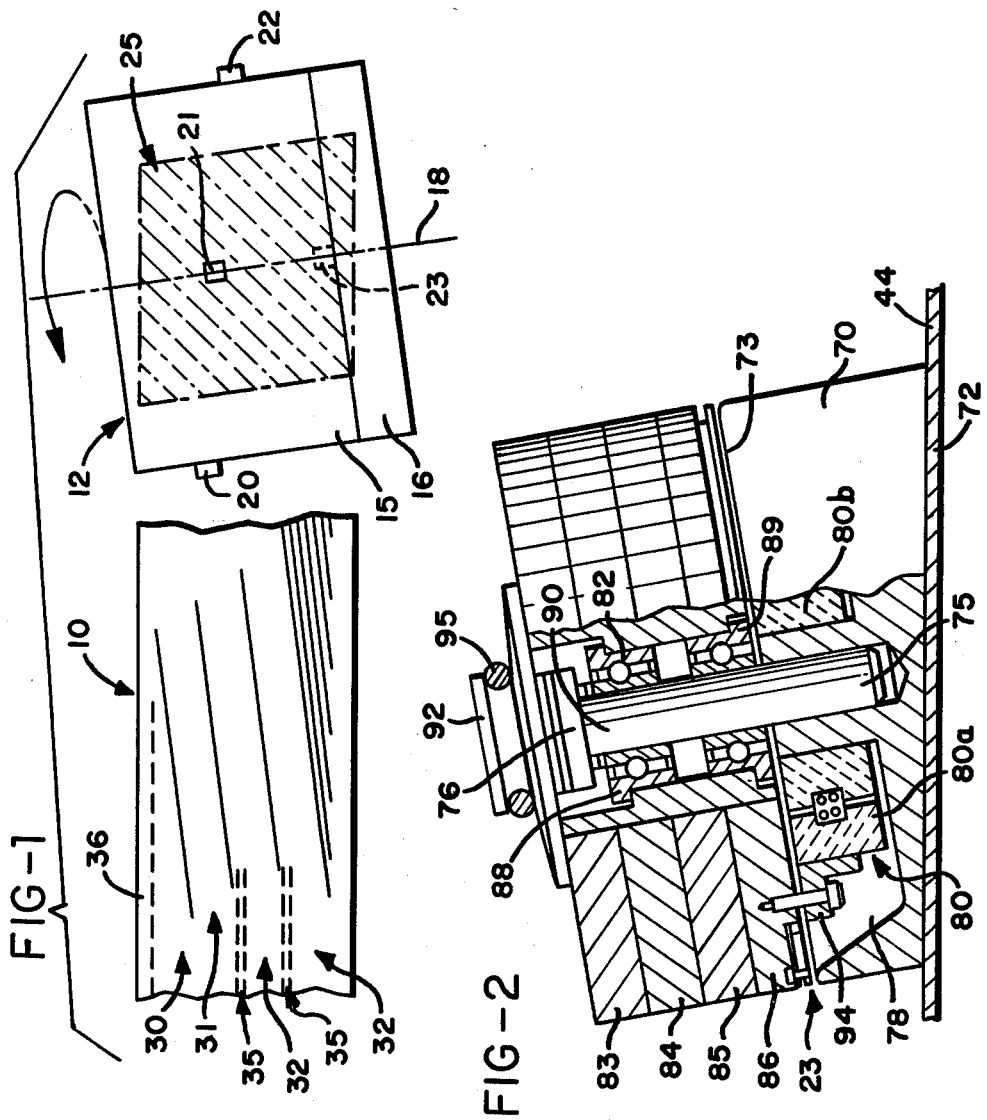
FIG. 1 is a diagrammatic view of a segment of recording tape and the scanner provided by the invention.
FIG. 2 is an enlarged view, partly in elevation and partly in cross section, showing details of the scanner.

FIG. 1 shows a length of recording tape 10 approaching a schematically represented scanner 12 which may be in the form of a drum 15 rotatably supported on a base 16. The axis of rotation 18 of the drum is located at a relatively small angle to a line perpendicular to the tape edges. Stated another way, the axis of rotation 18 is at a substantial angle, in the order of 80°, to the longitudinal center line of the tape and thus to the path of motion of the tape as it is transported to and around the scanner.

A plurality of transducers, shown as four, 20, 21, 22, and 23, are mounted at the surface of drum 15. Rotation of the drum, as indicated by the arrow in FIG. 1, causes each transducer to follow a different orbit, due to their axial spacing along the drum. The tape is guided through a turn contacting the drum over a scanning field, represented by the area 25, which is such that each transducer scans repeatedly a separate and discrete part of this field. In the embodiment shown, the turn of the tape is about 96°, and the scanner drum diameter may be in the order of 1.125 inches (286 mm), thus each transducer scans about 0.94 inch (2.387 mm) on the tape, at an acute angle (about 10°) to the tape length, along a separate independent track lengthwise of the tape. The change in elevation of an edge of the tape moving around the drum is about 0.160 inches (0.406 mm).

The four scan tracks are indicated in FIG. 1 at 30, 31, 32 and 33, and each contains a sequence of helically scanned recordings. Preferably there are narrow guard bands 35 between the tracks, and somewhat larger bands 36 at the sides of the tape for longitudinal recording of audio and/or control (e.g., servo) information.

Figure 3:
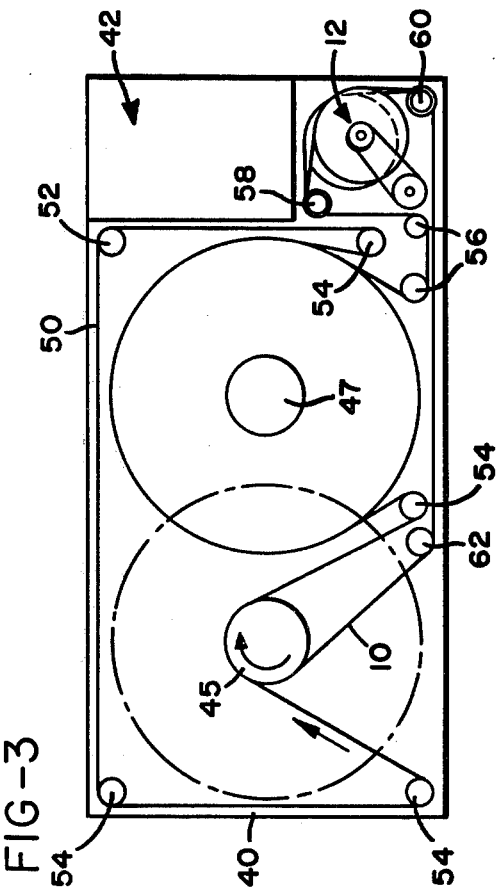
FIG. 3 is a plan view of one embodiment of recorder incorporating the scanner shown in FIGS. 1 and 2.
Figure 4:
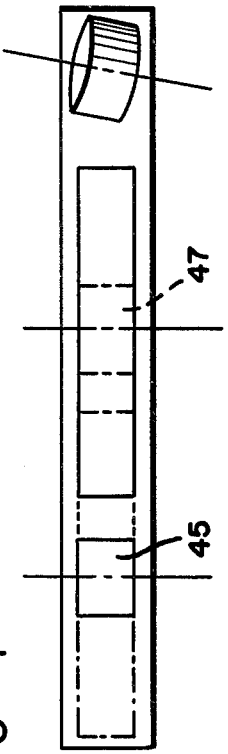
FIG. 4 is a side view showing in outline the major components of the recorder within a housing.

FIGS. 2, 3, and 4 illustrate the general arrangement of a miniature tape recording unit embodying the features of the present invention. Referring to FIG. 3, the unit comprises a generally rectangular housing 40 including a power and electronics package 42 in one corner thereof. This package may contain, for example, a drive motor 43 together with one or more electronic circuit assemblies (not shown) which provide the necessary circuitry for preamplification of head output, etc. With a unit of this small size, a multi-circuit output connection can be provided for connecting through a cable to a remote battery or similar power supply, and to power amplifier and other conventional circuits used with such tape recording devices.

Mounted in the housing 40, on a deck surface 44, is a take-up spool 45 having one end of the tape 10 fastened thereto, and a supply spool 47 mounted in spaced relation to the take-up spool 45, and having a quantity of the tape wound thereon. In FIG. 3, the supply spool 47 is shown full of tape, illustrated in solid lines, and the take-up spool 45 is shown empty, its diameter indicated in solid lines. The dot-dash lines indicate the diameter of a full take-up spool. It will be noted that there is some overlap of the full diameters, however, as one enlarges the other decreases such that there is no interference in fact.

Tape is transported from the supply spool to the take-up spool by the motion of a driving belt 50 which may be of the type disclosed in the aforementioned U.S. Pat. No. 3,305,186. This belt extends around a power driven capstan 52 and around four guide rollers 54 which guide belt 50, as shown in FIG. 3, around the tape on each of the spools, into the space therebetween, and back to the drive capstan 52. Thus, constant speed rotation of capstan 52 produces a constant velocity movement of the driving belt 50, and it in turn advances the recording tape 10 at a constant velocity. The tape 10 leaves the supply pack on spool 47 and passes around a pair of guide rollers 56, thence around a pair of flanged straightening and guiding posts 58 and 60, then to a further guide roller 62 and on to the take-up spool 45. The scanner 12 is mounted between the guiding posts 58 and 60, such that a turn of the tape 10, as previously explained, wraps around a portion of the surface of a rotating scanner drum, in the order of 96°.

FIG. 2 illustrates a suitable construction of the scanner drum. The mounting block 70 is arranged with a lower surface 72 adapated to be supported on the deck surface 44. A hollowed out upper surface 73 is constructed at the precise angle of inclination desired for the axis of rotation of the scanning drum, for example, 80° from the horizontal surface 72. The central portion of the mounting block 70 is provided with a bore which receives a spindle 75, this spindle extending upwardly beyond the surface 73, and being provided with a bore which receives a spindle 75, this spindle extending upwardly beyond the surface 73, and being provided with a cap 76 at its upper end. The central part of the upper block surface 73 is provided with a cavity 78 containing a rotary transformer 80, parts of which are later described.

The drum structure itself is comprised of a central cylindrical hub 82 and a plurality of disc members 83, 84, 85 and 86 stacked together and fitted to the hub 82. Inside the hub, upper and lower ball bearing are fitted, with these bearings indicated generally by reference numerals 88 and 89, the inner races of these bearings being fitted to support spindle 75, with the inner race of the upper bearing 88 precisely located with respect to the spindle cap 73 by one or more shims 90.

A drive pulley 92 is fastened to the cap 76, and a retainer ring 94 is bolted to the undersurface of the lower disc 86, and is fastened to the rotating windings 80$a$–$d$ of the rotary transformer. The stationary windings 81$a$–$d$ of that transformer are fitted around a central part of the block 72, in order to provide the required rotary coupling for the output signals from the respective heads. Each of the heads 20–23 is fitted to one of the rings 83–86, the lowermost head being shown in FIG. 2, and these heads being spaced around the scanner assembly 90° apart, in the case of the four-head arrangement shown. The drive for the scanner drum is provided by a belt 95 wich extends around the pulley 92 and to the output pulley 96 of the drive motor.

The transformer consists of the four primary windings 80a–d each of which is wired to one of the transducers or heads 20, 21, 22 and 23. Each primary windings is electromagnetically coupled with a corresponding secondary (stationary) winding 81a–d. The secondary windings in turn are connected to a switching or commutating circuit 98 which divides the signal, particularly during recording, among the several heads. The commutating circuit can be of any well known type, and is synchronized with the rotational speed of the scanner 12 in order to connect the particular head interfacing with the tape to the amplifiers, etc.

FIGS. 5 and 6 show another form of recorder in accordance with the invention, wherein the tape holding and handling mechanisms are provided in the form of a cassette, separate from the deck which mounts the scanner, the scanner drive, the final tape guiding posts, and the drive for advancing the tape.

The plan view of the deck 100 shows the drive motor 101 driving pulley 102 which is coupled via belt 103 to a pulley 104 attached to the shaft of the scanner assembly 105. This assembly is of the same type as shown in FIG. 2. The belt 103 also passes around an idler pulley 106 and to a speed changing set including the pulley 107 and output pulley 108 which in turn is connected via belt 109 to the tape drive pulley 110. It in turn, drives a capstan 115 which is journalled in the deck and operates, as later described, to advance the tape. On opposite sides of the scanner assembly, there are mounted primary straightening and guide posts 120 and 122 which function to guide the recording tape 125 precisely onto and off the scanner assembly.

A protective cover (omitted from FIG. 5) may extend over the scanner assembly as well as the capstan and guide posts which are accessible within the cassette receiving area 126. The drive motor and the above described pulleys and connecting belts are all housed within the deck.

The plan view of the cassette 13 shows the supply spool 132, carrying a full pack 134 of tape 125. Recording tape leaving the supply pack passes around a pair of end guide rollers 135, over a tension roller 137, which is carried on the end of a pivoting arm 138. The arm is spring-loaded by a suitable spring (not shown) to the position shown in full lines in FIG. 5, and can pivot under tension applied to the tape, as subsequently explained, to the position shown in FIG. 6.

From the tension pulley the tape passes around the rollers 135 across an opening 140 at one end of the cassette. The opening 140 is somewhat greater in width than the space occupied by the scanner assembly 105 with respect to the edge of the cavity in the deck. The cassette, when withdrawn from the deck, has a span of the recording tape extending across this opening. From the exit post 135 the recording tape passes to a rewind guide post or roller 142, and thence around the take-up spool 145.

The supply and take up spools are driven simultaneously by a drive belt system, which includes a tensioned drive belt 150 passing around the tape on the take up spool 145 and around intermediate guide rollers 152, then around the capstan backup or pinch roller 155, around the supply tape pack 134, over a tension roller 156. The tension roller is carried on a spring-loaded pivoting arm 157. The belt passes from the tension roller to a guide roller or post 158, then to a secondary driving and guide roller 160, and back to the take up spool 145.

The pinch roller 155 and the secondary drive roller 160 are connected by a belt 162, on the opposite side of the cassette body from the supply and take up spools. The diameters of rollers 155 and 160 are so related (as explained in U.S. Pat. No. 3,305,186) that, in conjunction with the tensioning roller 156, the belt is kept under tension which is reflected to the entire length of tape from the supply spool to the take-up spool.

Thus, when the cassette 130 is inserted into the cavity of the deck, the free span of the recording tape is drawn around the scanner 105 and into contact with the primary guide posts 120 and 122, precisely locating the recording tape with respect to the scanner. At the same time, the capstan 115 engages the drive belt 150 at the pinch roller 155. When the motor is energized it rotates the scanner at the desired speed, and also, through the capstan and the drive belt, rotates both the supply pack of recording tape and the take-up pack (clockwise as viewed in FIG. 5). The take up pack gradually enlarges as recording continues, thereby moving the recording tape past the scanner at a constant velocity, which is correctly correlated to scanner rotation. As the cassette is inserted and the free span of the recording tape is drawn around the scanner assembly and the primary guide posts, the arm 138 pivots, carrying the tension roller 137 with it, thereby accommodating the change in tape path.

FIG. 7 shows the same scanner assembly incorporated into a reel to reel tape deck. The same reference numberals with suffix a are applied to like parts. The location of the supply 132a and take-up 145a are reversed. The take-up is driven via belt 162a, and capstan 115a is on an idler set which also drives the belt which is tensioned as necessary by the roller 175, link 176, and tape tension sensor 177. The drag member 180 and arm 182 react from tension sensing roller 184 to keep the correct drag resistance on supply 132a.

Figure 8:
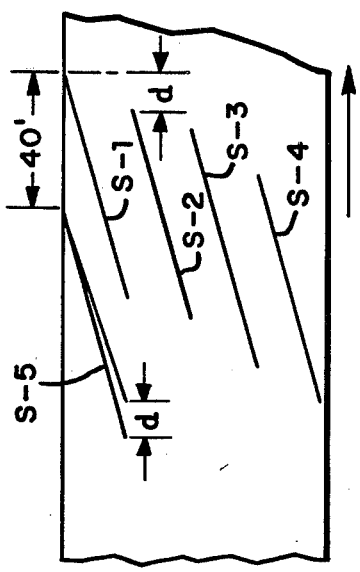
FIG. 8 shows a comparison of scans recorded at one speed and played back at a slower speed.
Figure 9:
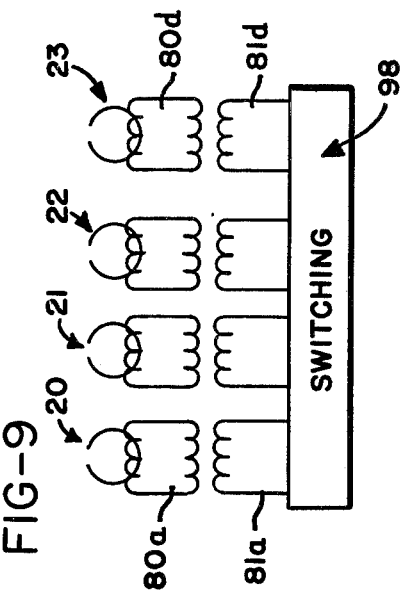
FIG. 9 is a diagram of a typical four head circuit.

FIG. 8 illustrates the manner in which tracking errors are minimized. With the format provided by the invention, tracking of recorded information is much less dependent on longitudinal tape speed, and adequate tracking is possible at even zero tape speed, although other provisions must be made to handle information read or played back at a slower rate. Thus, using the four head scanner 12, each scan S-1, S-2, S-3, and S-4 extends across 25% of the tape width, and the longitudinal tape movement which occurs during the scan period of one head (at normal recording speed) is indicated at d. As previously explained this would also equal a little more than one-quarter revolution of the scanner.

Unlike full scan recordings, the format of this invention does not lay down successive scans adjacent to each other, so the longitudinal tape motion between adjacent scans in the same path is $n \times d$, where n equals the number of heads used in the scanner. For example, in FIG. 8 the distance between adjacent scans S-1 and S-5 is 4d. If tape motion is stopped at a point where head 20 is beginning scan S-5, the path of head 20 will then be as shown by the dotted line. The scanning error at the end of scan S-5 is equal to d, but since the distance between adjacent scans (S-1 and S-5) in path 30 is 4d, the tracking error is 25% of the track pitch, as compared to 100% of track pitch in the case of a full width scan format.

Therefore, the format of the invention will reduce tracking errors caused by reduced longitudinal playback speed of the tape by a factor of n as compared to full width scan recording, where n is the number of non-coplanar heads used in the scanner, and as previously mentioned n can be a number greater than 3. Furthermore, if the ratio of guard band (space between successive scans in same path) to track pitch is greater than ½ n, this tracking error will not cause adjacent scan interference.

While the method and forms of apparatus herein described constitute preferred embodiments of this invention it is to be understood that the invention is not limited to these precise method and forms of apparatus, and that changes may be made therein without departing from the scope of the invention.

What is claimed is:

1. The method of signal recording comprising, moving a recording medium along a predetermined path, rotating a plurality of circularly and axially spaced transducer heads, guiding the tape at an angle to the axis of rotation and to such an angular extent that the heads scan sequentially in helical fashion along separate parallel longitudinal paths of equal width on the record medium, setting the rate of rotation such that a plurality of scans of equal length occur on the separate paths at predetermined spacing, and diverting the signal equally and in predetermined sequence to different ones of said heads.

2. The method of signal recording defined in claim 1, comprising establishing a length of scan for each head slightly greater than the circular spacing of the heads whereby the scanning of said heads and diverting of the signal to different heads causes some redundant recording of information in different ones of said paths.

3. The method of claim 2, arranging the circular spacing of the heads such that each redundant recording includes information recorded in a path that is adjacent an edge of said medium has the corresponding redundant information recorded in an internal path that is bounded by other parallel paths.

4. A method for recording on longitudinally moving recording tape, comprising transporting the tape lengthwise at a prdetermined constant speed, providing a scanner having an axis of rotation and supporting at least three transducers at locations separated both circularly and axially around the scanning axis whereby the transducers follow separate parallel orbits about a common axis of rotation, and guiding the tape in a turn around the scanner at an angle to the axis of rotation and of such angular extent that each transducer follows a series of scans within a separate longitudinal path on the tape, the scans being of equal length and the paths being of equal width.

5. A recording method as defined in claim 4, including distributing a signal to be recorded among the respective transducers.

* * * * *